United States Patent [19]

Falconer

[11] 3,974,449
[45] Aug. 10, 1976

[54] JOINT DECISION FEEDBACK EQUALIZATION AND CARRIER RECOVERY ADAPTATION IN DATA TRANSMISSION SYSTEMS

[75] Inventor: David Duncan Falconer, Red Bank, N.J.

[73] Assignee: Bell Telephone Laboratories, Incorporated, Murray Hill, N.J.

[22] Filed: Mar. 21, 1975

[21] Appl. No.: 560,576

[52] U.S. Cl. .................... 325/321; 325/42; 333/18; 333/28 R
[51] Int. Cl.² ........................................ H04B 1/16
[58] Field of Search ............... 178/88; 325/42, 65, 325/321, 323–324, 473–477; 333/17 R, 18, 28 R, 28 T

[56] References Cited
UNITED STATES PATENTS

| 3,375,473 | 3/1968 | Lucky | 333/18 |
|---|---|---|---|
| 3,581,207 | 5/1971 | Chang | 325/42 |
| 3,715,665 | 2/1973 | Chang | 325/42 |
| 3,755,738 | 8/1973 | Gitlin et al. | 325/42 |
| 3,787,762 | 1/1974 | Sato | 325/42 |
| 3,875,515 | 4/1975 | Stuart et al. | 178/88 X |
| 3,878,468 | 4/1975 | Falconer et al. | 325/42 X |
| 3,879,664 | 4/1975 | Monsen | 325/321 X |

OTHER PUBLICATIONS

D. D. Falconer, "Theory of Minimum Mean–Square Error QAM Systems Employing Decision Feedback Equalization," Bell System Technical Journal, (1973), pp. 1821–1849.

*Primary Examiner*—Robert L. Griffin
*Assistant Examiner*—Robert Hearn
*Attorney, Agent, or Firm*—J. P. Kearns

[57] ABSTRACT

An adaptive feedforward transversal equalizer acting jointly with a data decision-directed demodulating carrier recovery system to achieve substantially jitter-free passband equalization of a suppressed-carrier coherent data signal without the use of pilot tones is improved by adding a feedback transversal filter section operating on past demodulated data symbols. The weighted output of the feedback section is subtracted from the demodulated output output of the feedforward section to provide signals from which data decisions are made and common error signals are derived. Tap-gain coefficients for both feedforward and feedback filter sections and phase angle for the demodulating carrier recovery system are adaptively updated in accordance with the common error signal. Severe frequency offset and phase jitter are simultaneously compensated.

5 Claims, 4 Drawing Figures

JOINT DECISION FEEDBACK EQUALIZATION AND CARRIER RECOVERY ADAPTATION IN DATA TRANSMISSION SYSTEMS

FIELD OF THE INVENTION

This invention relates to the correction of the distorting effects of transmission media of limited frequency bandwidth on digital data signals and in particular to the joint adaptive control of transversal equalizers and demodulating carrier-wave recovery arrangements in phase-modulated (PM) and quadrature amplitude-modulated (QAM) data transmission systems.

BACKGROUND OF THE INVENTION

The transmission of digital data at high speeds, e.g., 9600 bits per second, over band-limited transmission channels, such as telephone voice channels, requires precision control over impairments resulting from linear distortion, nonoptimal choice of receiver sampling instant and carried phase shift. Intersymbol interference is a consequence of linear distortion and nonoptimum sampling. Phase jitter and frequency offset are manifestations of varying carrier phase shift.

My copending joint application with K. H. Mueller, J. Salz and D. A. Spaulding, Ser. No. 437,978 filed on Jan. 30, 1974, now U.S. Pat. No. 3,878,468 granted Apr. 15, 1975, disclosed a passband linear feedforward equalizer followed by a data-decision-directed, phase-tracking demodulating carrier-wave arrangement in a QAM high-speed, data transmission system. The passband arrangement there disclosed provided for joint carrier recovery and equalization adaptive to the respective products and differences of actual equalized and estimated reference signals at passband line frequencies. For carrier recovery the correlation of the actual and estimated equalizer output signals furnished a phase control signal. Equalizer tap gains were updated under the control of the mean-square error difference between actual and estimated equalizer output signals. The estimated equalizer output was derived from the difference between the actual equalizer output and the quantization of that output after remodulation to the passband of the received line signal. No pilot tones were required for carrier-wave recover.

It is an object of this invention to improve passband equalizers employed in high-speed suppressed-carrier data transmission systems by jointly setting tap-gain adjustments and compensating for transmission-channel carrier phase shifts based on a common error criterion and without employing pilot tones.

It is another object of this invention to combine a passband feedforward transversal equalizer, a baseband feedback equalizer and a data-decision-directed demodulating carrier wave control arrangement, all adaptive to a common error criterion, to compensate for intersymbol interference, frequency offset and phase jitter.

It is a further object of this invention to track rapidly varying transmission-channel phase shift from the same common error signal that controls the slowly adapting tap-gain coefficients of the feedforward and feedback transversal equalizers.

SUMMARY OF THE INVENTION

The above and other objects of this invention are accomplished according to this invention by the combination of a linear feedforward transversal equalizer generating weighted sums of consecutive samples of complex passband received data signals, a demodulator for signals emanating from the feedforward equalizer, a decision-directed demodulating carrier-wave recovery circuit, a quantizer for complex demodulated received signals, a nonlinear feedback transversal structure generating weighted sums of previously detected complex baseband signals from the quantizer, a combining circuit for taking the difference between complex demodulated signals from the feedforward equalizer and those from the feedback structure to supply input signals to the quantizer, a complex error computer operating on the mean-square difference between the input and output of the quantizer to supply control signals to each of the feedforward and feedback transversal structures and the carrier recovery circuit and a remodulator for translating the complex control signals for the feedforward transversal structure to the passband of the received signal. The received signal is assumed to be a suppressed-carrier double-sideband signal with both in-phase and quadrature-phase components, i.e., the received signal can be complex in its mathematical representation. This representation and hence the invention itself apply to quadrature amplitude-modulated (QAM) signals, phase-modulated (PM) signals, and combined amplitude and phase-modulated (AM-PM) signals.

The common error signal is derived partially from the condition of samples of received data signals just detected and partially from the condition of data signals previously detected. In effect, the error signal includes both a component from the feedforward equalizer section and a mop-up component from the feedback section. Combining feedback with feedforward equalization yields a lower means-square error than feedforward equalization alone for a given amount of linear distortion.

A feature of this invention is a general reduction in the total number of tap-gain coefficients relative to an all-feedforward linear equalizer to achieve a selected mean-square error in the presence of noise and linear distortion.

A further feature is reduced degradation in the mean-square error resulting from a nonoptimum choice of sampling instant.

In a further illustrative embodiment the feedback section can be supplied with both input and error samples remodulated to passband, rather than their corresponding baseband analogs.

DESCRIPTION OF THE DRAWING

The above and other objects and features of this invention will be more fully appreciated from a consideration of the following detailed description and the drawing in which.

DETAILED DESCRIPTION

For purposes of illustration it is assumed that the equalizer carrier recovery arrangement is being employed in a high-speed telephone-voiceband data transmission system using quadrature amplitude modulation. The basic signaling rate is the reciprocal (1/T) of the baud (symbols per second) interval T divided between two orthogonal, i.e., differing by ninety electrical degrees, phases of a common carrier frequency. The data signals applied to each orthogonal carrier phase can be independent, though synchronized, and multilevel. As an example, four-level baseband data signals can be applied to each orthogonal carrier phase for a practical equivalent binary data rate of 4/T bits per second while retaining a baud interval of T. For a baud rate of 2400 (T = 416⁺ microsecond) an equivalent binary transmission rate of 9600 bits per second can be reliably achieved.

The orthogonally related components of the modulated carrier wave are denominated "in-phase" and "quadrature-phase" in this specification.

Figure 1:
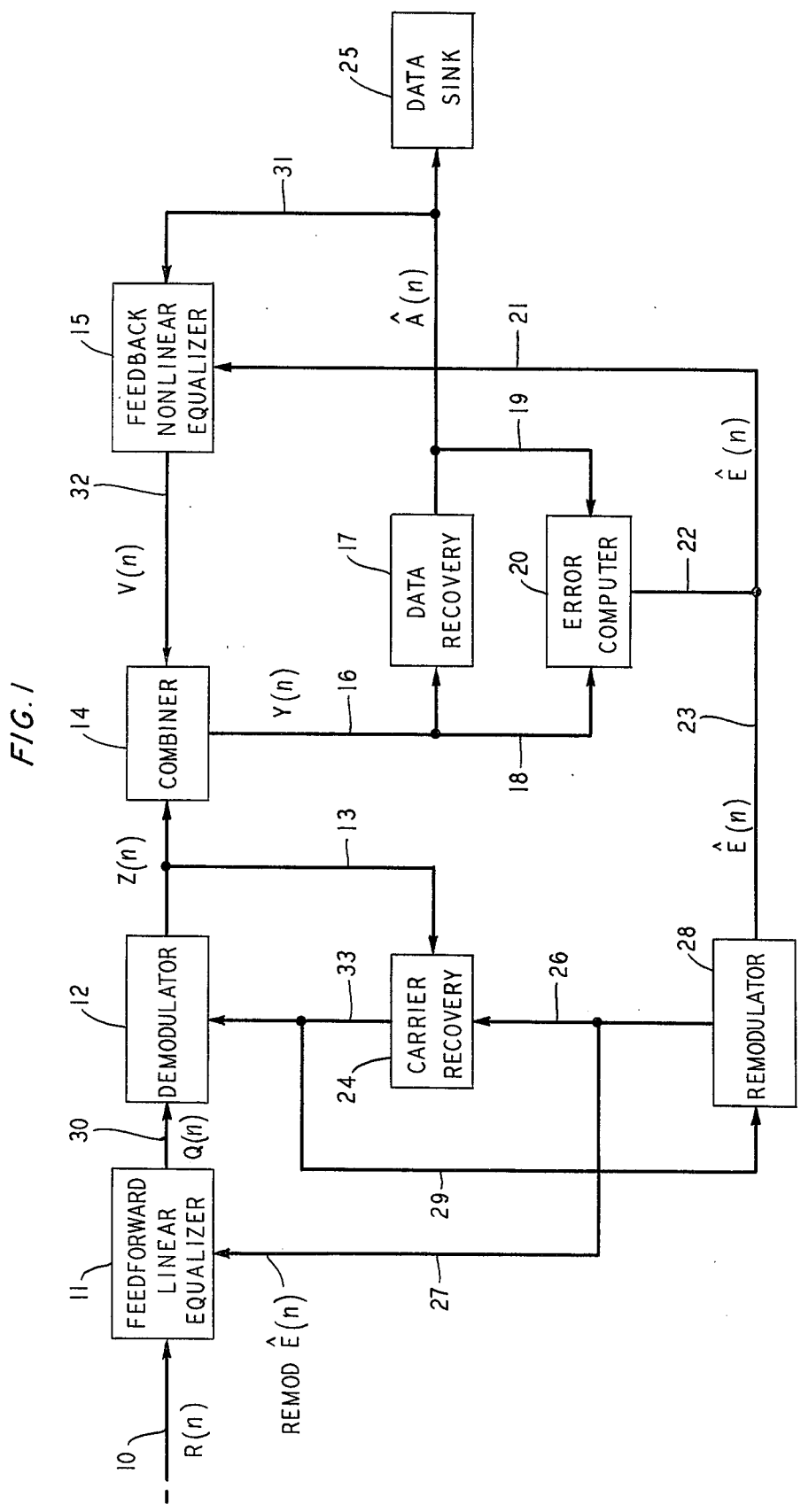
FIG. 1 is a simplified block diagram of a digital data receiver for a quadrature-amplitude-modulated data signal incorporating a feedforward passband and a feedback baseband equalizer together with a demodulating carrier-wave recovery arrangement adaptive to a common error signal according to this invention.

As shown in FIG. 1, the decision feedback equalizer with controlled carrier recovery broadly comprises feedforward linear transversal equalizer section 11 operating on the in-phase and quadrature-phase components of a received passband data signal $R(n)$ on input line 1 to form a partially equalized forward sum output $Q(n)$ on output line 30, demodulator 12 controlled by quadrature related outputs of carrier recovery 24 over lead 33 to produce a demodulated baseband data signal output $Z(n)$, feedback nonlinear equalizer section 15 operating on baseband output data decisions appearing on lead 31 to form a feedback sum output $V(n)$ containing the residue of any intersymbol interference not corrected by feedforward section 11, combiner 14 for forming a final equalized signal $Y(n)$ on lead 16 from the output of combiner 14, quantizer 17 for making data decisions $\hat{A}(n)$ on the equalized signal $Y(n)$, error computer 20 for obtaining mean-square error component $\hat{E}(n)$ from the differences between the input and output of quantizer 17, data sink 25 for accepting the quantized data signals $\hat{A}(n)$ from quantizer 17 as the ultimate usable output of the data receiver, and remodulator 28 for translating error component $\hat{E}(n)$ to the passband of the received signals as they are propagated through feedforward equalizer section 11. It is apparent that the common error signal $\hat{E}(n)$ controls the tap gains at baseband in feedback equalizer 15 and at passband in feedforward equalizer 11 and as well controls the phase of carrier recovery 24. A near optimum high speed data transmission system using bandlimited channels can thus be realized.

In operation the passband received wave is first transformed into a sampled wave, which has both in-phase and quadrature-phase components, as has been more fully explained in my above-cited joint copending application. The succession of pairs of discrete components is represented by a succession of complex samples $R(n)$. These samples can represent either discrete bilevel or multilevel data symbols. The samples $R(n)$ are next delayed in feedforward equalizer 11 by successive symbol intervals T so that a plurality of both in-phase and quadrature-phase samples are available for selective weighting under control of an error signal. The weighted plurality of data samples is recombined into an output signal from which most of the intersymbol interference except for that attributable to data symbols still to be estimated has been removed.

Figure 2:
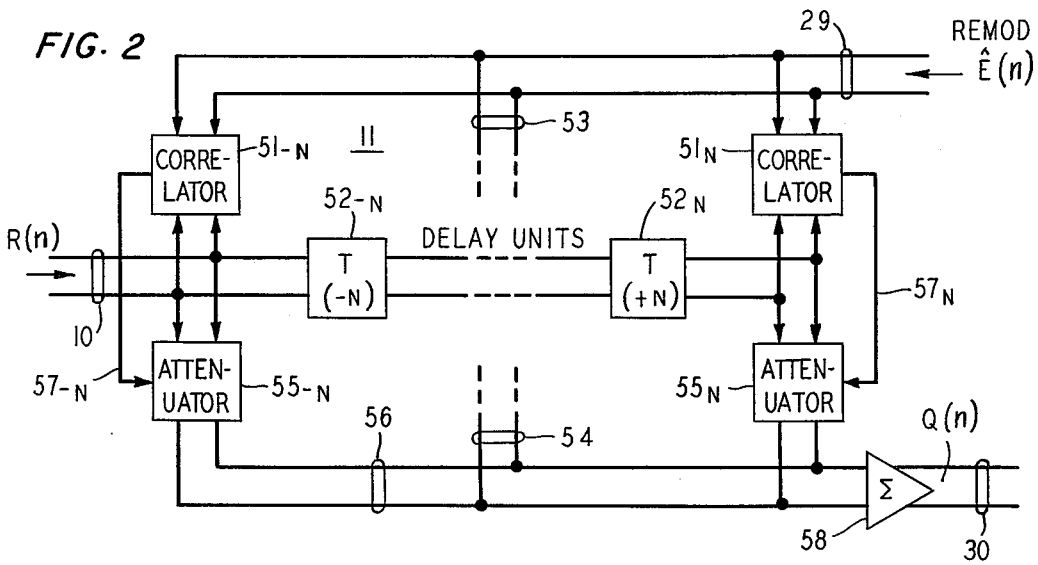
FIG. 2 is a more detailed block diagram of a feedforward transversal equalizer section useful in the practice of this invention.

FIG. 2 is a more detailed representation of feedforward equalizer section 11 which can comprise complex delay units 52 (of which $52_{-N}$ and $52_N$ are shown explicitly) up to a total of 2N + 1, complex attenuators or weighting devices 55 (of which the $55_{-N}$ and $55_N$ are shown explicitly) operating on the delayed tap signal samples at delay units 52 for delivery thereon to summation leads 56, complex correlators 51 (of which $51_{-N}$ and $51_N$ are shown explicitly) for combining the individual tap signal samples with the complex error signal $\hat{E}(n)$ on leads 29 to generate individual updating signals for attenuators 55, and summation circuit 58 for combining the selectively attenuated tap signals to form weighted output $Q(n)$. Broken lines between delay units 52 suggest the utilization of a plurality of such units in cascade up to the number (2N + 1, N being an integer up to whatever value is required for a desired performance level). Lead pairs 53 from error bearing leads 29 and lead pairs 54 from summation leads 56 suggest connections to intermediate taps between delay units 52 up to a total of (2N+1). Leads 57 (of which $57_{-N}$ and $57_N$ and shown explicitly) are control connections between correlators 51 and corresponding attenuators 55 for the purpose of updating tap-gain settings for the attenuators. The manner in which the error signal $\hat{E}(n)$ is developed is described hereinafter.

The weighted output $Q(n)$ of forward equalizer 11 appearing on lead 30 can be defined as $$Q(n) = \sum_{k=-N}^{N} W_k^* R(n-k), \quad (1)$$

where
- $W_k$ = ensemble of tap-gain coefficients implemented by attenuators 57; (The asterik denotes the complex conjugate.)
- $R(n-k)$ = samples available at the several taps associated with delay units 52;
- $n$ = time index of samples;
- $k$ = index of taps on equalizer; and
- $N$ = maximum number of leading and lagging taps.

Equation (1) recites that the output $Q(n)$ of equalizer 11 is the summation at each sampling instant $n$ of the products of the complex conjugates of the tap-gain coefficients and the present and past received signal samples available at that instant. The received signals are at passband, i.e., amplitude modulating a carrier frequency $f_c$, and include a noise component $N$ as well as linear distortion causing intersymbol interference, frequency offset and phase jitter. Intersymbol interference results from the differential spreading out of frequency components of the several data symbols into overlapping relationship. Frequency offset is a translation of the original transmitted carrier frequency up or down the frequency scale due to misalignment of modulating and demodulating carrier frequencies encountered in different parts of the transmission system. The frequency offset and phase jitter impairments are manifestations of a time-varying phase shift of the transmitting channel carrier wave.

The sequence of in-phase and quadrature-phase data symbols can be represented by another sequence of complex numbers $A(n)$. These latter numbers modulated the carrier frequency $f_c$ at synchronous instants T. Therefore, an alternative representation of the output of equalizer 11 can be expressed by $$Q(n) = e^{j2\pi f_c nT + \theta(n)}[\sum_{k=-\infty}^{\infty} B_k^* A(n-k) + N(n)], \quad (2)$$

where $B_k$ are complex samples of the overall impulse response of the transmission system including equalizer 11, $N(n)$ are complex noise samples and $\theta(n)$ is a sample of a waveform which varies slowly with respect to the symbol rate $1/T$ due to frequency offset and phase jitter.

Although an adaptive forward equalizer can in principle track and compensate for very small amounts of frequency offset and phase jitter, the rate of variation of $\theta(n)$ in equation (2) as it is encountered on telephone voice channels is often too great for a forward equalizer alone to handle. Instead compensation for $\theta(n)$ variation is effected within a demodulator following the passband forward equalizer. Under the control of a demodulating carrier wave from carrier recovery 24 over lead 33 demodulator 12 generates an output $Z(n)$ defined as follows $$Z(n) = Q(n)e^{-j2\pi f_c nT + \hat{\theta}(n)}, \quad (3)$$

where $\hat{\theta}(n) =$ the receiver's estimate of $\theta(n)$ from equation (2) in the $n$th symbol interval.

Demodulation following forward equalization is advantageous, especially where the time variation of $\theta(n)$ is unusually rapid, since the delay of the forward equalizer does not come between the computation of $\hat{\theta}(n)$ and the employment of $\hat{\theta}(n)$ in the demodulation process. It will be noted that the exponential terms denoting multiplication by the carrier component in equations (2) and (3) are conjugates of each other. Thus, equation (3) represents a baseband signal.

In order to obtain an output signal as free of intersymbol interferences as possible decision feedback equalization is introduced by way of feedback equalizer 15 whose weighted output $V(n)$ on lead 32 can be represented as a signal of the form $$V(n) = \sum_{k=1}^{M} B_k^* \hat{A}(n-k), \quad (4)$$

where $B_k$ = tap-gain coefficients for the feedback equalizer in which $k$ is positive.

$\hat{A}(n-k)$ = past receiver data decisions.

The feedback equalization signal defined by equation (4) is combined in combiner 14 to yield a further complex signal $Y(n)$ substantially free of intersymbol interference. Signal $Y(n)$ is represented in the output of combiner 14 as $$Y(n) = Z(n) - V(n) \quad (5)$$

If the feedback equalizer tap gains $B_k$ are all zero, it may be noted then the overall equalizer of FIG. 1 is substantially the same in structure as that described in my cited joint patent application.

Figure 3:
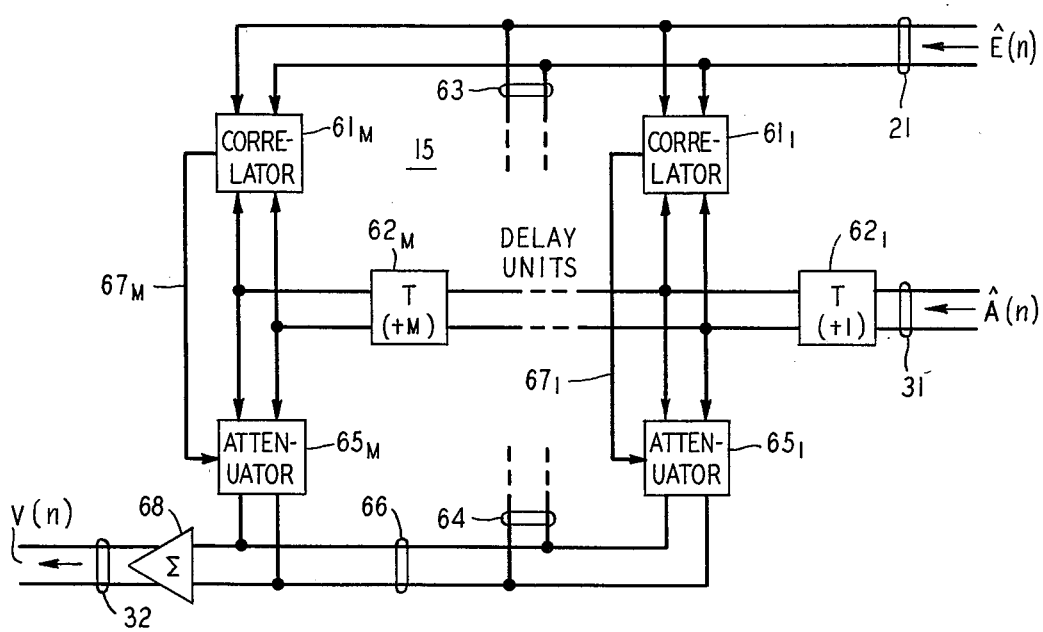
FIG. 3 is a more detailed block diagram of a feedback transversal equalizer section useful in the practice of this invention.

FIG. 3 is a more detailed representation of feedback equalizer section 15 of FIG. 1. Section 15 can comprise complex delay units 62 (of which $62_1$ and $62_M$ are shown explicitly) up to a total of M complex attenuators or weighting devices 65 (of which $65_1$ and $65_M$ are shown explicitly) operating on delayed data decisions $\hat{A}(n)$ at delay units 62 for delivery to summation leads 66, complex correlators 61 (of which $61_1$ and $61_M$ are shown explicitly) for combining the individual tap signals with complex error signal $\hat{E}(n)$ on leads 21 to generate individual updating signals for attenuators 65 over control leads 67 (of which $67_1$ and $67_M$ are shown explicitly), and summation circuit 68 for combining the selectively attenuated tap signals to form output $V(n)$. Broken lines between delay units 62 suggest the utilization of a plurality of such units in cascade up to the member M (M being an integer up to whatever value is required for a desired performance level). Lead pairs 63 from error-bearing leads 21 and lead pairs 64 from summation leads 66 suggests connection to intermediate taps between delay units 62 M in number. Leads 67 are control connections between correlators 61 and corresponding attenuators 65 for the purpose of updating tap-gain settings for the attenuators.

Feedback equalizer section 15 operates on past decisions only. Feedforward section 11 by contrast stores samples $R(n)$ which contain the effects of not-yet estimated as well as past data symbols.

Figure 4:
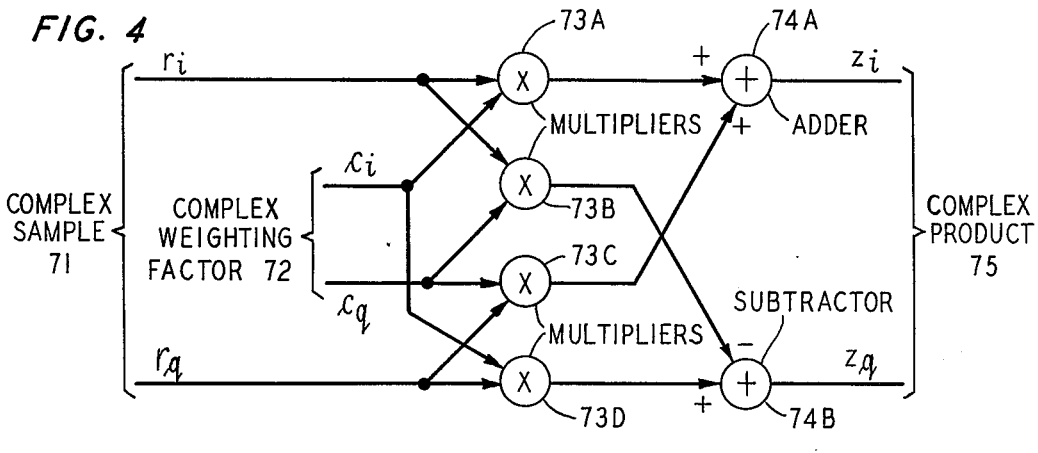
FIG. 4 is a block diagram of a complex multiplier for correlating two complex signals which is useful in the practice of this invention.

FIG. 4 represents an embodiment of a complex multiplier of use in the practice of this invention in attenuators 51 of FIG. 2 and attenuators 67 of FIG. 3. The complex multiplier comprises four real multipliers 73A, 73B, 73C and 73D and two real adders 74A and 74B for complex input sample $r_i + jr_q$ at input 71 and complex weighting factor $c_i - jc_q$, (the complex conjugate of $c_i + jc_q$) at input 72. The real (in-phase) signal sample $r_i$ is multiplied by the real weighting component $c_i$ in multiplier 73A and the imaginary (quadrature-phase) signal sample $r_q$ is multiplied by the imaginary weighting component $c_q$ in multiplier 73C. The products taken from the outputs of multipliers 73A and 73C are added in adder 74A to form the real (in-phase) output $z_i$ of a complex output product. Similarly, cross products of respective real and imaginary signal and weighting samples $r_i c_q$ and $r_q c_i$ are taken in multipliers 73B and 73D and combined (subtracted) in subtractor 74D to form imaginary output $z_q$ of a complex output product. Correlators 51 and 61 in FIGS. 2 and 3 are of similar construction.

In a system in which there are 2N+1 feedforward taps, the output $Y(n)$, obtained by combining equations (2), (3), (4) and (5), becomes $$Y(n) = e^{-j2\pi f_c nT + \hat{\theta}(n)} \sum_{k=-N}^{N} W_k^* R(n-k)$$

$$-\sum_{k=1}^{M} B_k^* \hat{A}(n-k). \quad (6)$$

An optimization criterion can be selected as the minimization of the mean square error from which the error $E(n)$ in the $n$th symbol interval is defined as $$E(n) = Y(n) - A(n). \quad (7)$$

Mean square error (MSE) is defined as an average over a stationary uncorrelated ensemble of random variables representing noise and data symbols.

The intersymbol interference-free output $Y(n)$ of combiner 14 on line 16 is applied to quantizer 17 which normalizes the input to the assigned discrete data levels, e.g. +1, +3, to obtain estimated output data symbols $\hat{A}(n)$. By subtracting the estimated symbols $\hat{A}(n)$ from output $Y(n)$ on lead 19 in error computer 20 to which $Y(n)$ is applied on lead 18, an estimated error $\hat{E}(n)$ is obtained as indicated by equation (7) on output lead 22. Thus, estimated error $\hat{E}(n)$ becomes $$\hat{E}(n) = Y(n) - \hat{A}(n). \quad (8)$$

The gradient of the squared magnitude of equation (8) with respect to each of the forward tap-gain coefficients $W_k$, feedback tap-gain coefficients $B_k$ and demodulating carrier phase $\hat{\theta}(n)$ can be shown to be $$\frac{\delta \hat{E}(n)^2}{\delta W_k} = 2 \hat{E}^*(n) R(n-k)e^{-j2\pi f_c nT + \hat{\theta}(n)} \quad (9)$$

$$\frac{\delta \hat{E}(n)^2}{\delta B_k} = -2 \hat{E}^*(n) \hat{A}(n-k) \quad (10)$$

and $$\frac{\delta \hat{E}(n)^2}{\delta \theta} = 2Im[\hat{E}^*(n)Z(n)]$$

$$= 2IM[e^{-j2\pi f_c nT} \hat{\theta}^{(n)}\hat{E}^*(n) \sum_{k=-N}^{N} W_k R(n-k)] \quad (11)$$

Equation (9) indicates that the incremental change in each of the feedforward tap coefficients $W_k$ is a function of the product or correlation of the complex received signal samples $R(n-k)$ and the complex conjugate estimated error $\hat{E}^*(n)$ modulated up to the frequency level of carrier wave $f_c$.

Equation (10) similarly indicates that the incremental change in each of the feedback tap coefficients $B_k$ is a function of the product or correlation of the decision-directed estimate of recovered data $\hat{A}(n-k)$ and the complex conjugate estimated error $\hat{E}^*(n)$ taken at baseband frequency level.

Equation (11) indicates that the incremental change in the demodulating carrier phase $\hat{\theta}(n)$ is a function of the imaginary part of the product of the complex conjugate error signal $\hat{E}(n)$ remodulated to passband and the summation of the output of the feedforward equalizer section.

Manipulation of equations (9), (10) and (11) results in gradient algorithms for updating the attenuation of or tap-gain settings in each of the feedforward and feedback equalizer sections 11 and 15 for updating the phase adjustment of carrier recovery 24 as shown in the following equations.

$$W_k(n+1) = W_k(n) - \beta(n) \hat{E}^*(n)$$
$$R(n-k)e^{-j2\pi f_c nT + \hat{\theta}(n)} \quad (12)$$

$$B_k(n+1) = B_k(n) + \gamma(n) \hat{E}^*(n) \hat{A}(n-k) \quad (13)$$

and $$\hat{\theta}(n+1) = \hat{\theta}(n) - \alpha(n)$$
$$Im \, e^{-j2\pi f_c nT + \hat{\theta}(n)}\hat{E}^*(n) \quad (14)$$

$$\sum_{k=-N}^{N} W_k^*(n) R(n-k)$$

Equation (12) states that the next $(n+1)$ tap-gain coefficient $W_k$ for feedforward equalizer section 11 in FIG. 1 is equal to the previous $(n)$ such coefficient adjusted by the negative $(-)$ of the complex products of an incrementing factor $\beta(n)$, the complex conjugate error signal $\hat{E}^*(n)$ modulated to passband and the signal sample $R(n)$ at the tap being updated. The incrementing factor $\beta(n)$ is a step-size chosen with due regard to noise levels and distance between discrete signaling levels.

Equation (13) similarly states that the next $(n+1)$ tap-gain coefficient $B_k$ for feedback equalizer section 15 in FIG. 1 is equal to the previous $(n$th$)$ value incremented by the product of incrementing factor $\Gamma(n)$, the error estimate $\hat{E}^*(n)$ and the stored data estimate $\hat{A}(n-k)$. The incrementing factor $\Gamma(n)$ is chosen according to the same criteria as $\beta(n)$.

Equation (14) states that the next $(n+1)$ phase adjustment $\hat{\theta}$ of the demodulating carrier wave in carrier recovery 24 in FIG. 1 is equal to the previous $(n$th$)$ value incremented by the proportion $\alpha(n)$ of the imaginary part of the correlation of the error estimate $\hat{E}^*(n)$ modulated to passband and the summation output of the feedforward equalizer section.

With the proper choice of $\alpha(n)$ and taking into consideration that the feedback and feedforward tap-gain coefficients $B_k$ and $W_k$ will converge to nearly optimum values with a consequent reduction in noise and residual intersymbol interference, equation (14) reduces to that of a first-order phase-locked loop of the form $$\theta(n+1) = \theta(n) + \sin[\theta(n)] - \theta(n)]. \quad (15)$$

where $\theta(n)$ = the modulation onto the received samples caused by phase jitter and frequency offset.

The adaptation coefficients $\alpha$, $\beta$ and $\Gamma$ can also be used to track slowly varying channel parameters. Any variation of a voiceband channel's impulse response is expected to be extremely slow. The coefficients $\beta$ and $\Gamma$ can be made smaller than coefficient $\alpha$ in order to minimize the contribution of random tap fluctuations to the overall error. Phase jitter and frequency offset on the other hand, are functions of the carrier phase shift $\theta(t)$, which is typically small in any given symbol interval T. It may be appreciable over an interval of 10T to 100T second, however. Typically, $\alpha$ is set on the order of one hundred times $\beta$ and $\Gamma$.

The error $\hat{E}(n)$ generated in the output of error computer 20 on lead 22 is delivered in baseband form directly to feedback equalizer 15 over lead branch 21 as shown in FIG. 1. Error $\hat{E}(n)$ is also delivered to remodulator 28 over lead 23 for translation to passband in implementations of equations (9) and (11). The passband error signal is then applied to carrier recovery 24 over lead 26 and to forward equalizer section 11 over lead 27. The details of the application of the baseband error signal $\hat{E}(n)$ to feedback equalizer section 15 and of the remodulated passband error signal to forward equalizer section 11 are shown in FIGS. 3 and 2, respectively, as previously discussed.

Carrier recovery 24 can advantageously be a phase-locked loop jointly controlled by the applied error signal and the output $Z(n)$ of demodulator 12 over lead 13. Phase-locked loops are well known in the art and detailed description is not believed necessary.

It has been determined from a comparison of error performance of a QAM data transmission system using forward equalization alone, as disclosed in my cited prior application, and the same type of system using both forward and feedback equalization as described in this specification, that the combined equalization arrangement provides an improvement in performance as the data rate reaches four bits per symbol. In a voiceband QAM system operating at a baud rate of 2400 and at four levels per baud an improvement in the range of zero to 1.6 decibels was observed. Each of the forward-only and combination equalization arrangements employed the same total number of taps.

In an alternative embodiment feedforward equalizer 11 and demodulator 12 can be interchanged so that all equalization is performed at baseband.

A third alternative is to operate feedback equalizer section 15 in FIG. 1 at passband by remodulating the $\hat{A}(n)$ output of data recovery 17 to passband, applying the remodulated error signal on lead 27 to feedback section 15 by way of lead 21, moving demodulator 12 to the output of combiner 14 and applying the passband outputs of both equalizer sections 11 and 15 directly to combiner 14.

The addition of decision feedback equalization also reduced the sensitivity of performance to the choice of timing epoch, i.e., the instant within the symbol interval in which sampling is performed.

While this invention has been described in terms of specific illustrative embodiments, it is to be understood that its principles are susceptible of a wide degree of modification within the scope of the following claims.

What is claimed is:

1. In a data receiver for data signals subject to intersymbol interference and synchronously modulated onto quadrature phases of a carrier wave including a feedforward transversal equalizer for operating on each of the quadrature-related received signals, a demodulator responsive to a demodulating carrier wave for operating on each of the quadrature-phase received-signal components in the output of the feedforward equalizer, a source of the demodulating carrier wave for such demodulator a data recovery circuit for deriving quantized baseband output signals from equalized signals and a data sink for utilizing baseband output signals the improvement comprising a feedback equalizer operating on quantized baseband signals from said data recovery circuit, means for combining the demodulated output of said feedforward equalizer with the output of said feedback equalizer to form an equalized output signal, and means jointly responsive to the error differences between the outputs of said combining means and said data recovery circuit for generating error control signals for each of said feedforward and feedback equalizers and said demodulating carrier-wave source.

2. The data receiver defined in claim 1 in which said feedback equalizer comprises delay elements connected in tandem for storing complex sequences of equalized baseband output signals, complex attenuators for operating on baseband signals available at each of said complex delay elements, complex correlators responsive to error control signals from said generating means for modifying baseband signals available at each of said delay elements for supplying update signals to said complex attenuators, and a summation circuit for combining outputs from all of said attenuators into an output signal proportional to residual intersymbol interference in the output of said data recovery circuit.

3. A data decision-directed equalizer for quandrature amplitude modulated received signals transmitted at synchronous intervals comprising a feedforward linear transversal filter for said received signals for generating partially equalized signals at passband frequencies, a demodulating carrier-wave source, a demodulator responsive to carrier waves from said source for translating the partially equalized signals from said feedforward filter to baseband frequencies, a feedback nonlinear transversal filter for quantized baseband output signals for providing residual signals proportional to intersymbol interference remaining in the baseband output signals, combining means for partially equalized signals translated to baseband frequencies by said demodulator and said residual signals to form a finally equalized output signal, quantizing means for transforming the finally equalized output signal from said combining means to said baseband output signals, error-computing means responsive to the difference between the finally equalized output and the output of said quantizing means to form a data-decision derived error control signal, means responsive to said demodulating carrier-wave source for remodulating said error control signal to the passband of said feedforward filter;

first means for applying said error control signal directly to said feedback filter for coefficient adjustment;

second means for applying said error control signal after remodulation to passband by said remodulating means to said feedforward filter; and a data sink for utilizing data signals from said quantizing means.

4. In combination with a quadrature-amplitude modulated data transmission system operating at passband frequencies and subjecting transmitted signals to intersymbol interference, a data receiver comprising a feedforward transversal equalizer operating on quadrature-amplitude modulated passband data signals, a demodulator for translating to baseband frequency levels the partially equalized signals from said feedforward equalizer, carrier recovery means for supplying demodulating carrier waves to said demodulator, a feedback transversal equalizer operating on quantized data signals at baseband frequency levels to produce a residual output proportional to intersymbol interference remaining in previously quantized data signals, a combiner for demodulated partially equalized signals from said demodulator and residual signals from said feedback equalizer to form fully equalized signals, data recovery means for quantizing said fully equalized signals, error-computing means taking the difference between the input and output of said data recovery circuit to form an error control signal, and means responsive to said error control signal for updating said feedforward and feedback equalizers and said carrier-wave means.

5. The combination according to claim 4 in which each of said feedforward and feedback equalizers comprises a tandem array of delay elements, means for correlating signals at the junctions of the delay elements of said tandem array with said error control signal to form coefficient-adjusting signals, and attenuating means at the junctions of the delay elements of said tandem array responsive to said coefficient-adjusting signals.

* * * * *